(12) United States Patent
Cerbari et al.

(10) Patent No.: US 11,407,568 B2
(45) Date of Patent: Aug. 9, 2022

(54) SEAL WITH A BLOCKABLE ROTOR FOR MEASURING INSTRUMENTS

(71) Applicants: Serghei Cerbari, Chisinau (MD); Alexandr Lubenschii, Chisinau (MD)

(72) Inventors: Serghei Cerbari, Chisinau (MD); Alexandr Lubenschii, Chisinau (MD)

( * ) Notice: Subject to any disclaimer, the term of this patent is extended or adjusted under 35 U.S.C. 154(b) by 420 days.

(21) Appl. No.: 16/474,581

(22) PCT Filed: Mar. 2, 2018

(86) PCT No.: PCT/MD2018/000002
§ 371 (c)(1),
(2) Date: Jun. 28, 2019

(87) PCT Pub. No.: WO2018/160051
PCT Pub. Date: Sep. 7, 2018

(65) Prior Publication Data
US 2019/0375563 A1    Dec. 12, 2019

(30) Foreign Application Priority Data

Mar. 3, 2017   (MD) ..................... md a 2017 0023

(51) Int. Cl.
*G09F 3/03*     (2006.01)
*G09F 3/14*     (2006.01)
(Continued)

(52) U.S. Cl.
CPC .............. *B65D 55/02* (2013.01); *E05B 39/02* (2013.01); *G09F 3/03* (2013.01); *G09F 3/14* (2013.01); *G02B 6/02* (2013.01)

(58) Field of Classification Search
CPC ........ G09F 3/03; G09F 3/0305; G09F 3/0364; G09F 3/037; G09F 3/0382; G09F 3/14;
(Continued)

(56) References Cited

U.S. PATENT DOCUMENTS

| | | | | |
|---|---|---|---|---|
| 4,978,026 A | * | 12/1990 | Gnoinski | .............. G09F 3/0352 292/307 R |
| 5,180,200 A | * | 1/1993 | Georgopoulos | ...... G09F 3/0352 292/315 |
| 5,402,958 A | | 4/1995 | Mahaney | |
| 5,419,599 A | * | 5/1995 | Georgopoulos | ...... G09F 3/0364 292/315 |

(Continued)

FOREIGN PATENT DOCUMENTS

| | | |
|---|---|---|
| EA | 200501160 A2 | 12/2005 |
| MD | 2155 F1 * | 4/2003 |

(Continued)

*Primary Examiner* — Alyson M Merlino
(74) *Attorney, Agent, or Firm* — Rumit Ranjit Kanakia

(57) ABSTRACT

The invention relates to means for sealing measuring instruments and equipment, specifically to seals with a blockable rotor to enable monitoring for unauthorized access to instruments measuring consumption of electrical and heating energy, natural gas and water. A seal with a rotor comprises a transparent body (1) made from a high-strength plastic and formed with a cylindrical cavity (2) having a blind end and openings (3) which are formed on lateral sides of the cavity (2) and through which a flexible sealing element passes, and a rectangular cavity (4) which is installed at the open end of the cavity (2), transversely with respect to the latter, wherein the cavities (2) and (4) are interconnected. A rotor (6) is arranged in the cavity (2) so as to be rotatable in one direction. Openings for the flexible sealing element are formed in the lateral walls of the cavity (2) and in the rotor. A cross-shaped blocking element (9) is installed at one end of the rotor. A device (5) for blocking the rotation of the rotor is arranged in the cavity (4), one end of which device is provided with two projections in the form of a fork (13), between which a trapezoidal groove (15) is formed for securing the cross-shaped blocking element (9).

4 Claims, 3 Drawing Sheets

(51) Int. Cl.
*B65D 55/02* (2006.01)
*E05B 39/02* (2006.01)
*G02B 6/02* (2006.01)

(58) Field of Classification Search
CPC ............. G09F 3/0352; Y10T 292/48; Y10T
292/491; Y10T 292/497; Y10T 292/498;
Y10T 292/499; Y10T 292/509; Y10T
292/51; Y10T 292/492; Y10T 292/496;
Y10T 292/502; Y10T 292/505; Y10T
292/506; Y10T 292/507; Y10T 292/513;
Y10T 292/522; Y10T 292/528; Y10T
24/1416; Y10T 24/2187
See application file for complete search history.

(56) References Cited

U.S. PATENT DOCUMENTS

| | | | | |
|---|---|---|---|---|
| 6,000,736 | A * | 12/1999 | Leon ................ | G09F 3/0352 |
| | | | | 292/307 R |
| 6,390,519 | B1 * | 5/2002 | Dreisbach ......... | G09F 3/0352 |
| | | | | 292/307 R |
| 9,175,501 | B2 * | 11/2015 | Nazzari ............. | G09F 3/0364 |
| 10,186,176 | B2 * | 1/2019 | Nazzari ............. | G09F 3/0364 |

FOREIGN PATENT DOCUMENTS

| | | | | |
|---|---|---|---|---|
| MD | 149 Y * | 2/2010 | | |
| MD | 4034 B1 | 4/2010 | | |
| RU | 54014 U1 | 6/2006 | | |
| WO | WO-2011056054 A1 * | 5/2011 | ............ | G09F 3/03 |

* cited by examiner

SEAL WITH A BLOCKABLE ROTOR FOR MEASURING INSTRUMENTS

FIELD OF THE INVENTION

The invention relates to means for sealing measuring instruments and equipment, specifically to seals with a blockable rotor to enable monitoring for unauthorized access to instruments measuring consumption of electrical and heating energy, natural gas and water.

BACKGROUND

A patent publication MD3134G2 discloses a monoblock seal with a cable comprising a body in which a blind longitudinal channel is made where the end of the cable is fixed, where a through channel is cut in the longitudinal direction for the location of the cable inside of it. The through and blind channels are made parallel to each other, so that the outlet of the blind channel and the inlet of the channel are located on the same side of the body. Also, the body has an inclined opening communicating with the through channel where the fixing element with a spreader for interaction with a cable is installed. The body is made entirely of metal and the end of the cable is additionally fixed by deformation of the body, in a point of the blind channel with the formation of a loop at 180°. The body features, parallel to the inclined opening, an auxiliary inclined opening, which communicates with the auxiliary through channel made in the body, parallel to the longitudinal through channel for placing the cable; at the same time the outlet of the through channel and the inlet of the auxiliary through channel are located on the same lateral of the body and between the outlet of the through channel and the outlet of the auxiliary through channel, a cavity is made for laying the cable protected by the side projections. Outside the body is covered by high-strength plastic shell protecting from the access to the seal elements in the closed position.

Another patent publication RO119490B1 discloses a seal designed to ensure the complete integrity of various protected objects, consisting of a body having a primary cylindrical semi-frame made of plastic and equipped with coaxial openings made in, the core installed with the possibility of rotating the inner part inside of the semi-frame with a handle while coaxial openings are designed to receive the ends of the sealing cable, the core being equipped with the ratchet locks on its outer surface interacting with longitudinal ribs available on the inner surface of the cylindrical semi-frame and with circular projections limiting the circular cavity, moreover, the cylindrical semi-frame is provided with a groove into which a projection is inserted, made on a bolster installed inside the second cylindrical semi-frame.

Yet another publication U.S. Pat. No. 5,402,958A discloses a seal designed for the assembled components comprising of a tubular frame, a rod, a flexible elongated element, a means of the rod rotation in one direction and a means to counteract rotation relative to the frame. The frame has a circular lateral wall surrounding the central shaft, and the lateral wall has the first opening in the wall. The rod has an opening oriented parallel to the first opening in the wall and a flexible elongated element coining out of the frame. The free end of the flexible element comes through the parallel openings of the assembled components and then through the round lateral wall and the rod. The rod is then rotated in a direction relative to the body to wrap the segment of the element around the rod. The disadvantages of this seal are low reliability and inability of visual inspection, inspection of the entire cable if it was damaged or broken inside the seal.

The closest prior art to the current invention is an indicator seal for measuring instruments disclosed in MD4034C1, which includes a transparent plastic body made of a cylindrical cavity with a bottom and coaxial openings on the lateral surface through which a flexible sealing element is extended and another cavity with a bottom where a blocking device is installed, while the lower cavity communicates with the cylindrical cavity by means of a through groove whereas the core with openings coaxial with openings on the lateral surface of the cylindrical cavity, with the core installed in a cylindrical cavity with the possibility of a cylindrical cavity rotation in one direction thanks to the ratchet locks contacting with longitudinal ribs made on the inner surface of the cylindrical cavity. The protection device is made with a projection ending with a flexible latch entering the through channel of the core via the through channel; the cavity with the bottom and the safety device are made in the form of a rectangular shape, while on the sides of the safety device rigid elements are made that contact with the projections made on the inner sides of the rectangular lower cavity with the bottom, whereas the part of the core between the round edges has a cross-shaped configuration. The main drawbacks of the device, in accordance with the latest technical, solutions, are low efficiency of sealing the objects to protect them against unauthorized disassembly while it is possible to remove the safety device by drilling the contact part of the flexible projections of the safety device with rigid projections of the seal body and inability to automate the device assembly process associated with the loss of time during the assembly.

The technical problem solved by the current invention is the development of a seal with a blockable rotor, which design meets modern technological and information requirements in order to improve the efficiency of the closure process and ensure the integrity of the seal, possibility of automating the assembly and reduction of the assembly time, placing information about the seal. Thanks to a bar code.

It has the following advantages:

The design of the seal meets modern technological requirements;

The technical solution of the blocking device provides effective and irreversible sealing as well as reliable protection of the sealed object from unauthorized disassembly;

Ability to place the information about the seal due to the bar code;

Production of seals in blocks of 5 pieces;

Ability to automate the assembly and reduce the cost of the seal;

Ability to install the seal in two stages: 1—pre-installation; 2—final installation and blocking of the rotor.

SUMMARY

The seal with a blockable rotor, according to the invention, eliminates the above disadvantages due to the fact that it contains a transparent body made of high-strength plastic formed as a cylindrical cavity with one blind end and a flat rectangular cavity installed on the open end of the cylindrical cavity, transversely to it, whereas these cavities communicate with each other. Inside the cylindrical cavity there is a rotor able to rotate in one direction by means of a flexible ratchet locks made on it, which contact with longitudinal ribs made on the inner surface of the cylindrical cavity and on the lateral walls of the cavity and on the rotor where there are coaxial openings for the flexible sealing element. The rotor is separated by a partition dividing it into two cavities for the flexible sealing element. On one end of the rotor, a blocking cross-shaped element is fixed and a removable handle is installed on the outer front side of the rotor. In a flat rectangular cavity a device is installed to block the rotation of the rotor, one end of which is provided with two fork-shape projections between which a trapezoidal groove is made to fix the blocking cross-shaped element. Flexible ratchet locks are installed on the sides of the blocking device while the rigid ribs are made on the inner sides of the rectangular cavity. A rectangular cavity is made on the outer side of the blocking device for applying the reference data about the seal. The blocking device is made with the possibility of mounting in a rectangular cavity in two positions: for pre-mounting and for complete locking of the rotor.

The technical, result obtained in accordance with the present invention consists in a significant increase of protection and reliability degree of the seal due to the production of the inner wall of the blocking device equipped with two fork-shaped projections allowing to block the rotor, on both sides thus preventing its rotation and subsequent extraction. In addition, the production of the seal in blocks of five pieces connected by jumper bars allows to automate the assembly, shorten the assembly time and reduce the price of the finished product.

BRIEF DESCRIPTION OF THE DRAWINGS

The essence of the claimed technical solution is explained by the description of the drawings (FIGS. 1-3) as follows:

DETAILED DESCRIPTION

Figure 1:
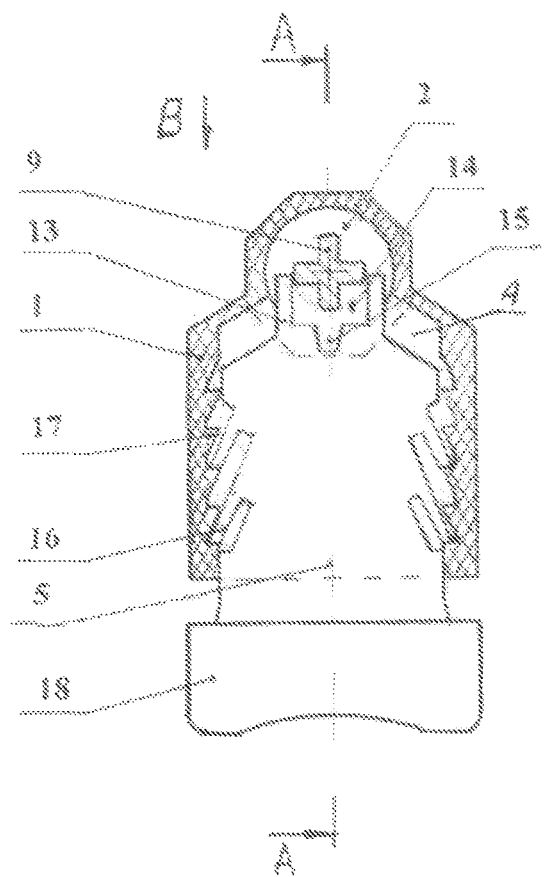
FIG. 1, in section view of the seal with the assembled rotor blocking device.
Figure 2:
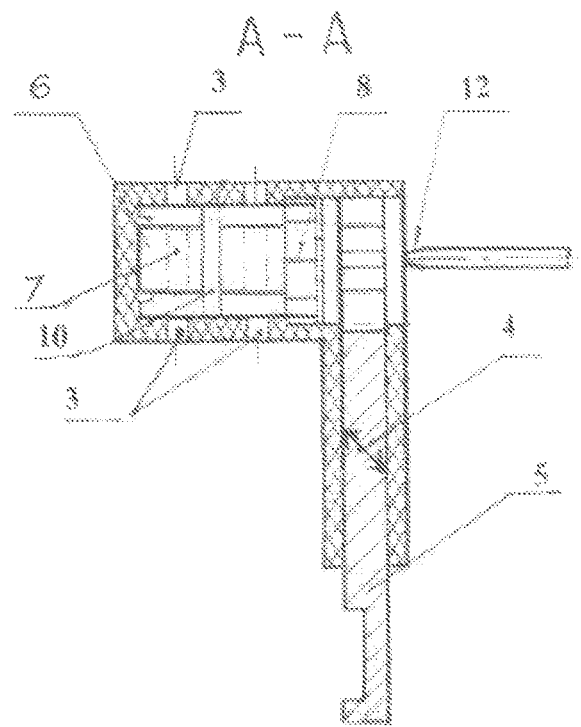
FIG. 2, side view, section B-B.
Figure 3:
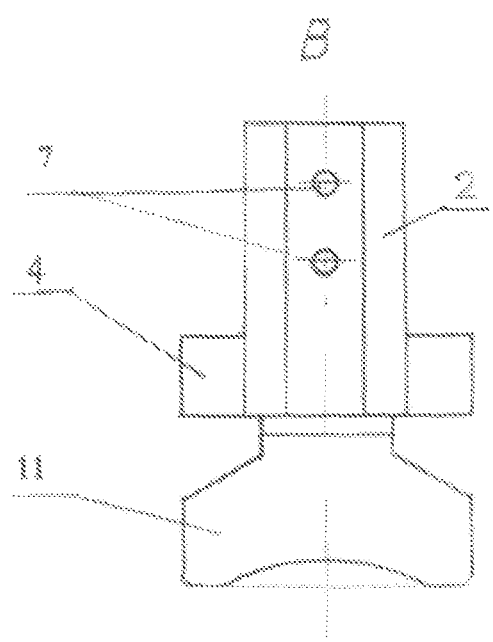
FIG. 3, view, section A-A.
Figure 4:
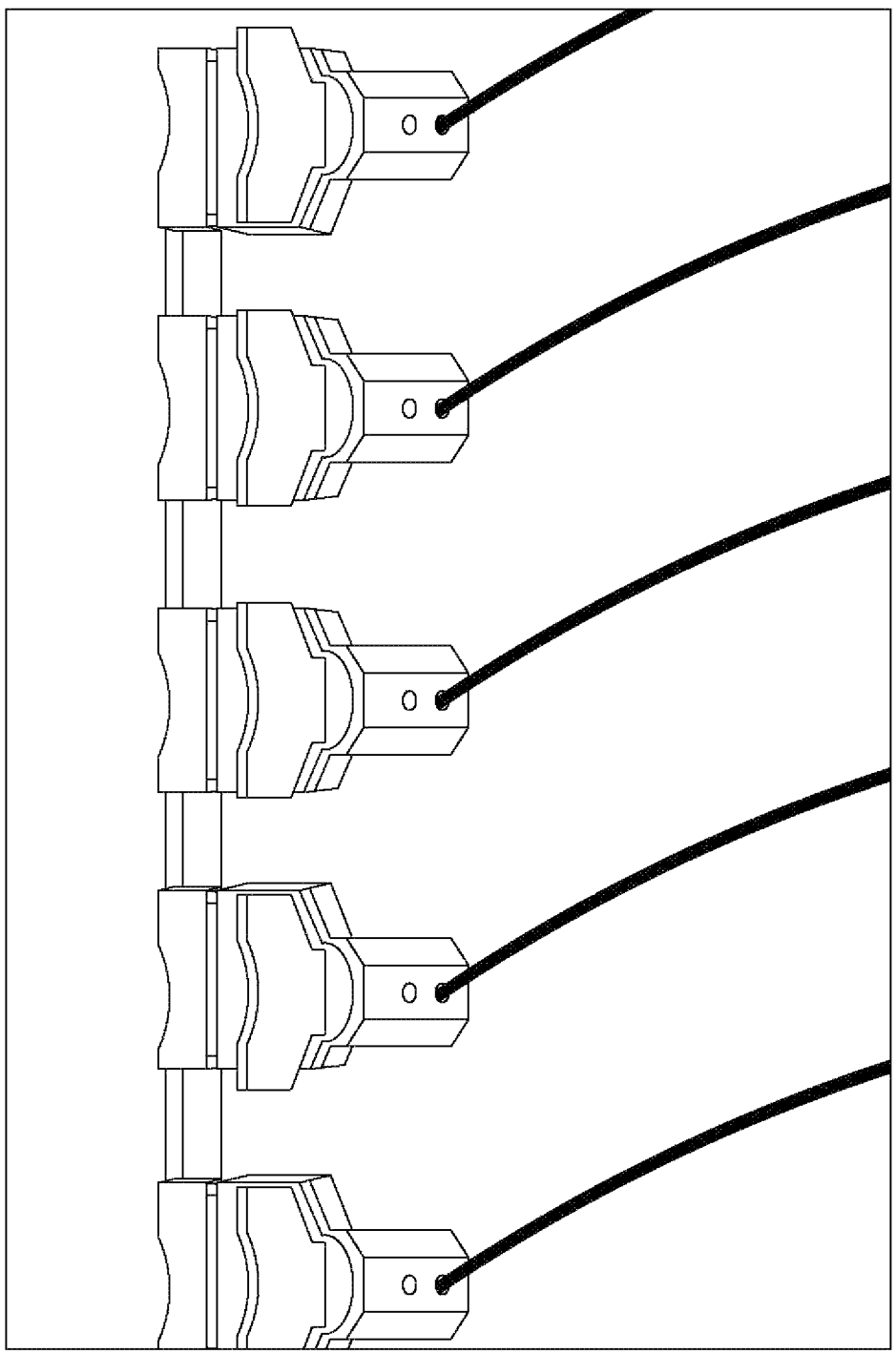

The seal with a blockable rotor for measuring instruments comprises a transparent body 1 made from a high-strength plastic formed with a cylindrical cavity 2 having a blind end and openings 3, which are formed on lateral sides of the cavity 2, through which a flexible sealing element passes, and a rectangular cavity 4, which is installed at the open end of the cavity 2, transversely with respect to the latter, wherein the cavities 2 and 4 are interconnected. Cavity 4 contains a device 5 to block the rotation of the rotor 6 while the cylindrical cavity 2 houses the rotor 6 with the openings 7, coaxial with the openings 3 located on the lateral sides of the cylindrical cavity 2. Rotor 6 is arranged in the cylindrical cavity 2 so as to be rotatable in one direction with the help of flexible ratchet locks 8 made on it, contacting with longitudinal ribs made on the inner side of the cavity 2. Rotor 6 is equipped with a blocking cross-shaped element 9, which provides blocking of the rotor rotation during the sealing. Partition 10 divides the rotor 6 into two concentric cavities for winding a flexible sealing element on it. On the front outer side of the rotor 6, a handle 11 is installed made in the form of two separate blades with the possibility of their separation from the rotor by breaking off in the point of thinning 12. The lower side of the blocking device 5 is equipped with two fork-shaped projections 13. A trapezoidal groove 15 is made in the cavity 14 between the projections 13, contacting the blocking cross-shaped element 9 when the rotor 6 is locked. The flexible ratchet locks 16 are installed on the sides of the locking device 5, contacting with rigid ribs 17 made on the inner sides of the cavity 4. A rectangular cavity 18 is made on the outer side of the blocking device 5 to apply a bar code containing information about the seal with the option to automatically read the information.

The device 5 for blocking the rotation of the rotor 6 is designed so that it can be installed in two stages: 1—pre-installation, allowing the rotation, of the rotor and winding of the flexible sealing element (cable); 2—final installation and blocking of the rotor 6. The inability to remove the rotor 6 from the cavity 2 is achieved by equipping the inner side of the blocking device 5 with two fork-shaped projections allowing, after sealing, to block the rotor 6 on both sides, preventing its rotation and axial movement.

The blocking device 5 and the body 1 of the seal are made of plastic, resistant to external influences and mechanical forces, with the blocks of five pieces connected by jumper bars, thereby providing the opportunity to automate the assembly, leading to a decrease of both the assembly time and the cost of the seal.

Flexible sealing element can be made of steel cable, polymer fiber optic cable or webbed copper cable.

Method of assembly of the seal with the blockable rotor for measuring instruments.

In the cavity 2 of the body 1, made by casting method from a transparent plastic, the rotor 6 is installed, after which the blocking device 5 is inserted into the rectangular cavity 4 in such a way as to allow ratchet locks 16 on its sides to contact with the rigid ribs 17 on the inner sides of the cavity 4, with the condition that the cavity 14 with the trapezoidal groove 15 does not interlock with the locking cross-shaped element 9 on the rotor 6, ensuring its' free rotation. After that, the free end of the flexible sealing element is inserted into one of the openings 3, made on the lateral walls of the cavity 2, pre-arranged coaxial with the openings 7 of the rotor 6. Then, with the help of the handle 11, one or two clockwise rotations are made fixing the flexible sealing element on the rotor 6. Availability of the ratchet locks 8 on the rotor 6 interacting with the longitudinal ribs on the inner surface of the cavity 2 ensures the rotation of the handle 11 only in one direction while the end of the flexible element inserted into the body 1 of the seal cannot be removed without damaging the body. Thus, this position completes the first stage of pre-installation of the seal ready to be delivered to the addressee for further use.

Installation and blocking of the seal on the material object is performed as follows.

An operator inserts the free end of the flexible element through the openings or lugs of the object to be sealed and then passes it through the openings 3 of the cavity 2 and the openings 7 of the rotor 6 and then rotates the rotor 6 with the handle 11 winding the flexible element on it until it is fully tensioned. Then, the external walls of the blocking device 5 are exposed to an action until its full insertion into the inner part of the cavity 4 in such a way that the cavity with the outer surface 14 with a trapezoidal groove 15 would come into contact with the blocking cross-shaped element 9 of the rotor 6. As a result of the coupling of the fork-shaped projections 13 of the blocking device 5, the rotor 6 is completely locked on both sides, preventing its rotation and extraction. Thus, the procedure for the final installation of the seal is completed after which the handle 11 should be broken off at the thinning point 12 from the contact area with the outer surface of the rotor 6.

What is claim is:

1. A seal for measuring instruments, the seal comprising: a blockable rotor; a transparent body made from plastic and formed with a cylindrical cavity having a blind end and openings, which are formed on lateral sides of the cylindrical cavity, and through which a flexible sealing element passes, and formed with a rectangular cavity, which is installed at the open end, of the cylindrical cavity and extends transversely with respect to the cylindrical cavity, wherein the cylindrical cavity and the rectangular cavity are interconnected, wherein the blockable rotor is housed within the cylindrical cavity so as to be rotatable in one direction with the help of flexible ratchet locks located on the blockable rotor that contact with the longitudinal ribs located on an inner side of the cylindrical cavity, wherein the blockable rotor includes openings configured to be located coaxially with the openings of the cylindrical cavity so as to receive portions of the flexible sealing element, wherein the blockable rotor is divided by a partition into two cavities for winding of the flexible sealing element on the blockable rotor when the blockable rotor is rotated in the one direction, wherein a blocking device is configured to be located in the rectangular cavity and to block the rotation of the blockable rotor in the one direction within the cylindrical cavity, wherein a blocking cross-shaped element is mounted on one end of the blockable rotor and a handle is installed on a front outer wall of the blockable rotor, wherein the blocking device includes a fork-shaped end with two projections and a trapezoidal groove formed between the two projections, wherein the two projections cooperate with the blocking cross-shaped element to block the rotation of the blockable rotor in the one direction, and wherein the blocking device further includes flexible ratchet locks located on lateral walls of the blocking device that engage with rigid ribs located on inner walls of the rectangular cavity when the blocking device is located in the rectangular cavity.

2. The seal according to claim 1, wherein a rectangular cavity is located in an outer side of the blocking device, external to the rectangular cavity of the transparent body, in which a device containing reference data for the seal is located.

3. A seal assembly comprising a plurality of the seals according to claim 1, with the blocking device of each seal being connected to at least one other seal of the plurality of seals with at least one jumper bar.

4. The seal according to claim 1, wherein when the blocking device is located within the rectangular cavity, the blocking device is in an installed state, and when the blocking device is not located within the rectangular cavity, the blocking device is in a pre-installed state.

* * * * *